United States Patent [19]

Vella

[11] 4,161,297
[45] Jul. 17, 1979

[54] YARN FEEDING DEVICE

[76] Inventor: Sergio Vella, Via Trossi 10, 13051 Biella (Vercelli), Italy

[21] Appl. No.: 665,568

[22] Filed: Mar. 10, 1976

[30] Foreign Application Priority Data

Mar. 10, 1975 [IT] Italy .............................. 21079 A/75

[51] Int. Cl.$^2$ .......................................... B65H 51/20
[52] U.S. Cl. ................................ 242/47.01; 66/132 R; 139/452; 242/47.12
[58] Field of Search ............... 242/47.01, 47.04, 47.05, 242/47.08, 47.09, 47.10, 47.11, 47.12, 47.13, 49; 66/132 R; 139/452

[56] References Cited

U.S. PATENT DOCUMENTS

| | | | |
|---|---|---|---|
| 3,225,446 | 12/1965 | Sarfati et al. ................. | 242/47.01 X |
| 3,411,548 | 11/1968 | Pfarrwaller .................... | 242/47.12 X |
| 3,490,710 | 1/1970 | Muhlhausler ...................... | 242/47.01 |
| 3,782,661 | 1/1974 | Deniega et al. ............... | 242/47.01 X |
| 3,940,079 | 2/1976 | Vella ................................. | 242/47.12 |
| 3,944,156 | 3/1976 | Jacobsson et al. ................. | 242/47.12 |
| 3,995,786 | 12/1976 | Deniega ........................... | 242/47.01 |
| 4,037,802 | 7/1977 | Calamani et al. .............. | 242/47.12 X |

Primary Examiner—Stanley N. Gilreath
Attorney, Agent, or Firm—Young & Thompson

[57] ABSTRACT

In a feeding device with constant adjustable tension for a yarn being fed from a yarn source to a yarn using machine, as a weaving machine, are provided: a fixed hollow body, around which the yarn coming from said source is wound into turns by an element rotating outwardly of said fixed body and coaxially thereto, to form thereon a yarn reserve from which the actual yarn is drawn, to be sent to said yarn using device, passing inside the fixed hollow body; an adjustable brake means cooperating with said fixed body, for braking the yarn with constant intensity, downstream of said yarn reserve; and a device associated with the fixed hollow body, for adjusting and keeping even the amount of said yarn reserve. The brake comprises a round element, formed by a solid central part and by a peripheral part with radial blades, arranged between an electromagnet mounted on said rotary element for winding the yarn, and the outer edge of said hollow body onto which the yarn gets wound, said blades being elastically bent at their ends with which they engage said edge, and said electromagnet housing the end of its core into an appropriate seat provided at the center of the solid part of said round element.

9 Claims, 4 Drawing Figures

YARN FEEDING DEVICE

BACKGROUND OF THE INVENTION

This invention relates to a yarn feeding device with constant adjustable tension, the yarn being fed from a yarn source to a yarn using device, particularly for use in weaving and knitting machines, of the type comprising: a fixed hollow body, around which the yarn coming from said source is wound into turns by an element rotating outwardly of said fixed body and coaxially thereto, to form thereon a yarn reserve from which the actual yarn is drawn, to be sent to said yarn using device, passing inside the fixed hollow body; adjustable brake means cooperating with said fixed body, for braking the yarn with constant intensity, downstream of said yarn reserve; and means associated and the fixed hollow body, for adjusting and keeping even the amount of said yarn reserve.

A yarn feeding device of this type is described in my U.S. Pat. No. 3,940,079.

This application relates to important improvements of the already cited type of yarn feeding device.

Such improvements concern the means for braking the yarn at the outlet of the device, the means adjusting the yarn reserve, and the mounting of the motor of the rotary element.

SUMMARY OF THE INVENTION

According to a first characteristic of the improved feeding device according to the invention, the brake means of the device itself comprise a round element—formed by a solid central part and by a peripheral part with radial blades—arranged between an electromagnet, mounted on said rotary element for winding the yarn, and the outer edge of said hollow body onto which the yarn gets wound, said blades being elastically bent at their ends with which they engage said edge, and said electromagnet housing the end of its core into an appropriate seat provided at the centre of the solid part of said round element.

According to a further characteristic of the improved device according to the invention, the means for adjusting and keeping even the amount of the yarn reserve wound on the actual feeder, comprise two photoelectric elements—of which one is a transmitting element and the other is a receiving element—carried by an arm mounted inside said hollow body, with possibility of being adjusted along the axis of said body, said elements being arranged so that the emission of one element may be picked up by the other, only if reflected by the yarn wound as reserve on said hollow body.

According to an even further characteristic of the improved device according to the invention, the said hollow body is fixed onto a hollow shaft which is fixed to a casing of the device, in which is mounted the stator of the motor operating said rotary element, the rotor of said motor being mounted on a second hollow shaft, rotating around the first and being integral with said rotary element.

BRIEF DESCRIPTION OF THE DRAWINGS

The invention will now be described in detail with reference to the figures of the accompanying drawings, which represent a preferred embodiment thereof and in which:

FIG. 4 is a view along to the axis of the device—with some parts in section—of the means for adjusting the reserve.

DESCRIPTION OF THE PREFERRED EMBODIMENT

Figure 1:
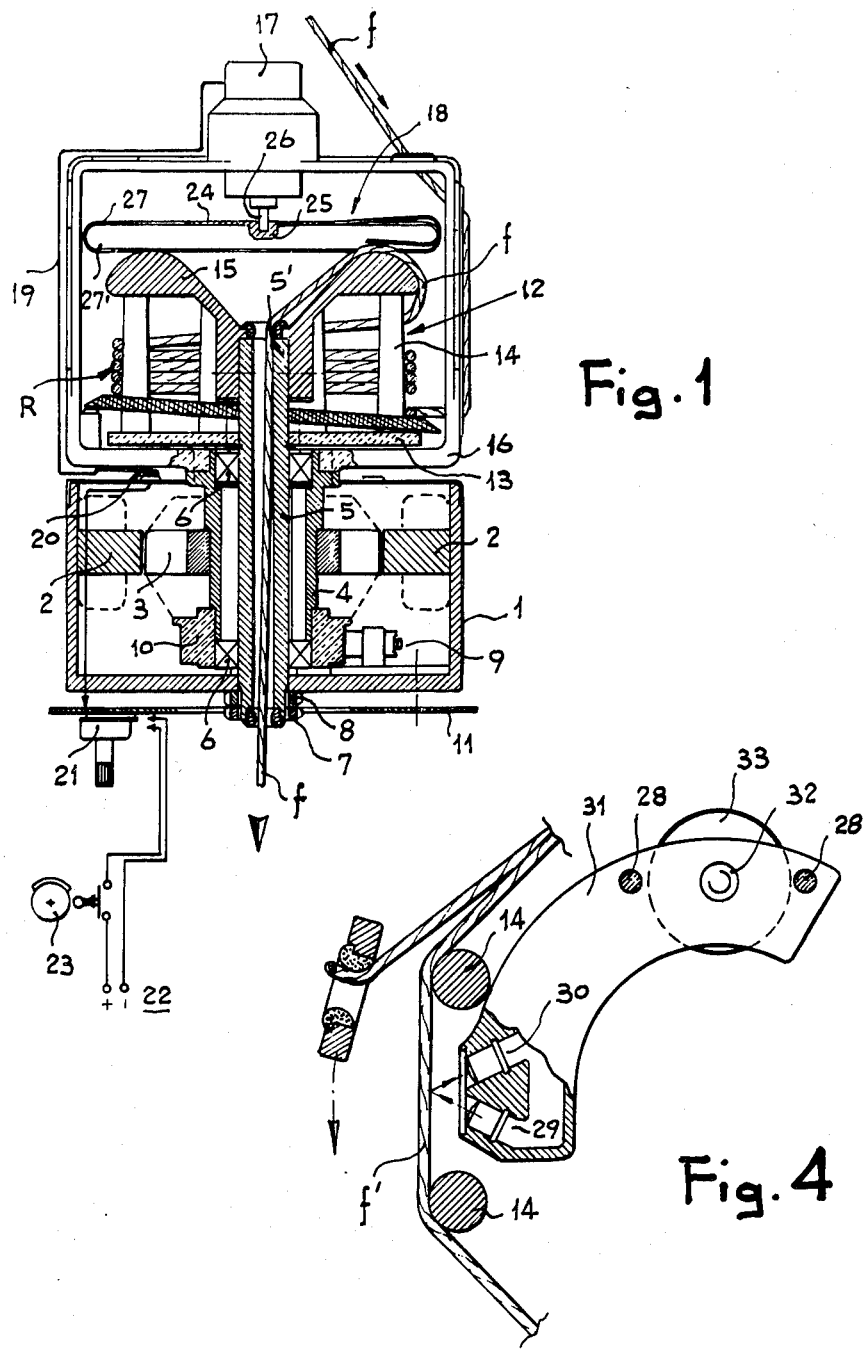
FIG. 1 is a comprehensive axial section view, of the improved device according to the invention.

With reference to FIG. 1, the device comprises a casing 1 which houses a direct current electric motor, of which may be seen the stator 2 and the rotor 3. The rotor 3 is mounted on a hollow shaft 4 which is rotatable, by means of bearings 6, about a second hollow shaft 5 which is stationary. The hollow shaft 5 is fixed, by means of threaded ring nuts 7, 8, onto the bottom of the casing 1 and projects, with a wide section 5', from the opposite side of the casing. The feed brushes 9 and the commutator 10 of the motor are also indicated, while reference 11 indicates a panel containing the group of electronic circuits for controlling the reserve, the motor speed and the braking.

On the section 5' of the hollow shaft 5, projecting from the casing 1, is fixed a hollow body 12 comprising a bottom disc 13, a set of frustoconical columns 14 mounted at the periphery of the disc 13, and a funnel-shaped body 15.

Figure 2:
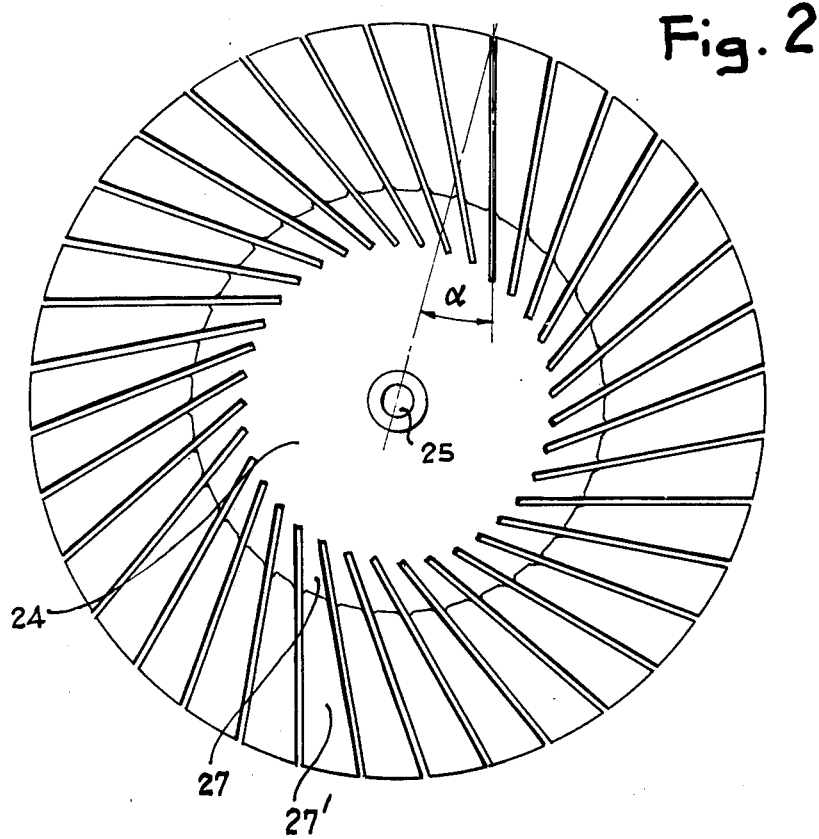
FIGS. 2 and 3 are two views of the improved brake means of the device itself, FIG. 2 being a top view and FIG. 3 being an axial cross section view.
Figure 3:
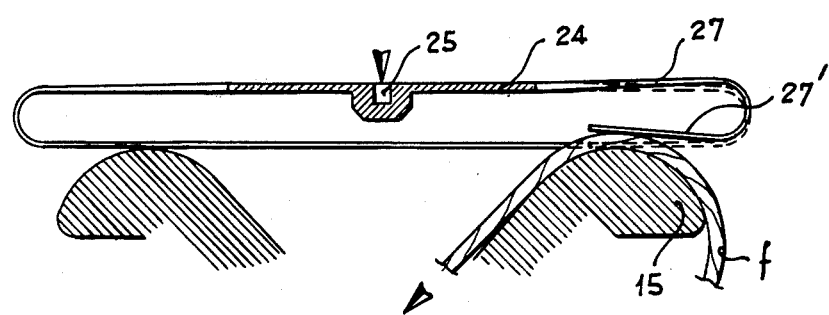

Also the rotatable hollow shaft 4 of the rotor 3 of the motor projects, by a short length, from the casing 1. To said shaft is fixedly connected a framework 16, which surrounds the hollow body 12 and carries outwardly an electromagnet 17. Between the electromagnet 17 and the hollow body 12 are arranged the brake means 18, shown in detail in FIGS. 2 and 3. The framework 16 is caused to rotate by the motor, to feed the yarn f for winding it onto the columns 14, in order to form a reserve R. From the reserve R, the yarn winds onto the funnel-shaped body 15, passes between the upper edge thereof and the brake 18, and then moves away passing through the fixed hollow shaft 5.

The electromagnet 17 is fed by a conductor 19, integral with the rotary framework 16 and connected through a sliding contact 20 to a potentiometer 21. In turn, the potentiometer 21 receives electric energy from a direct current source 22, either directly, or—as shown in FIG. 1—through a cam switch 23, the function of which is explained hereinafter.

The brake means 18 (FIGS. 2 and 3) comprise a round element of synthetic plastic material, of which the solid central part 24 is provided with a seat 25, adapted to envelop the projecting end 26 of the core of the electromagnet 17, and the periphery of which is formed by a plurality of blades 27 (thirty-six in FIG. 2), smoothly bent at their ends 27', so as to form highly elastic elements for engagement with the upper edge of the funnel-shaped body 15 and with the yarn f, between said body and the actual blades. As known, the yarn—when sliding in respect of the body 15 and of the brake 18—performs a movement comprising a sliding and a rotation, the latter causing the continuous cleaning of the brake and hence improving its efficiency. The blades 27 are hence inclined in respect of the radius by an $\alpha$ angle, to take into account the radial and tangential components of the sliding of the yarn in respect of the brake. Taking into account the different friction factors between yarn and brake, said inclination has been set at 15°, and this prevents almost entirely the crossing by any part of the yarn, of the slit separating one blade from the next one (as is required, since the transverse crossing of the slit would cause an undesired scraping effect on the yarn).

The reason for making the round element of the brake with a rather high number of peripheral blades, instead of making it solid, is due to the need for preventing the local deformation—deriving from the presence of the yarn—from affecting the whole brake, instead of only a small part thereof, as in the case of the present arrangement. It should in fact be considered that with a yarn drawing speed of 15 m/s, since each turn is about 0.3 m long, the rotation speed under the brake is about 50 rev/s, that is, the brake deformation in correspondence of the point of contact with the yarn has to rotate completely 50 times per second; if the periphery of the round element of the brake is solid, the mass involved is high and the brake, having too much inertia to follow the rotation of the yarn, gets detached from the body 12, causing an abrupt change in the braking. By dividing the periphery of the round element of the brake into several separated elastic elements, the above drawback has been perfectly overcome; the yarn 3, passing again through the same point, always finds the respective blade already at rest and in condition to brake regularly; in fact the blade, itself elastic, does not transmit its deformation to the others and, having a slight inertia, acts so as to promptly return to its rest condition.

The braking action, that is, the strength with which the elastic elements 27 press onto the upper edge of the hollow body 12, can be adjusted by means of the electromagnet 17. In fact, by means of the potentiometer 21, it is possible to regulate the current feeding the electromagnet, thereby modifying the strength with which the core 26 presses the brake 18 onto the body 15. This is obtained by turning the handle of the potentiometer 21, without having to stop the feeding device, as was instead necessary in the embodiment of the main patent. Moreover, if the cam switch 23 is provided—as in FIG. 1—it is possible to plan the braking intensity according to a predetermined cyclic law. In this connection, it should be born in mind—with reference to one of the most important applications of the device according to the invention, namely that to shuttleless weaving looms—that the highest accelerations are produced in the yarn with consequent high chances of breaking such yarn, when starting the movement of introduction into the shed of the weft-carrying gripper or the like, or upon gripping of the weft by such grippers. At such times, the braking on the yarn should be very slight; this can be obtained through the illustrated system, by temporarily turning off the voltage from the electromagnet of the brake, by means of the cam switch 23.

The present invention also provides to improved means for controlling the yarn reserve wound onto the hollow body 12. Such means are clearly illustrated in FIG. 4. They are arranged entirely inside the cage formed by the frustoconical columns 14 (FIGS. 1 and 4) and they are mounted on guides 28 (FIG. 4) which are parallel to the columns 14 and on the inner side thereof.

In the known devices, as for example the one described in the above mentioned patent, the control of the yarn reserve was performed through an axially movable microswitch, housed inside the winding cone; the front of the reserve advanced up to when it touched the microswitch, by operation of the latter; this caused the stopping of the motor. The drawback of this simple system was due to the fact that the front of the reserve had to perform mechanical work on the microswitch and this clashed with the requirement to have the turns wound on the cone as loose as possible, that is, not stretched. However, according to the present invention, the control system adopted requires no mechanical action by the reserve. A glow diode 29 and a phototransistor 30 are housed in an arm 31, which is axially movable on the guide 28 by means of a screw 32, which can be caused to rotate by an operating wheel 33 to adjust the position.

When the front of the reserve f' advances, sliding onto the columns 14 which favour its movements with their frustoconical shape, and reaches the position of the photoelectric unit, the infrared radiation emitted by the diode 29 is diffused by the yarn turns and may thus be picked up by the phototransistor 30, which electrically operates the stopping of the motor; the angle between the axes of the two elements—the emitter 29 and the receiver 30—is such that they coincide at a point which lies on the winding plane of the yarn turns, so that any surfaces reflecting further away—as periodically, for example, the rotary framework 16—have no effect at all on the phototransistor.

It is to be understood that any variants and modifications of the described embodiment of the improved device according to the present patent application, very rightly fall within the scope of the invention itself, as defined by the following claims.

I claim:

1. Yarn feeding device with constant adjustable tension, the yarn being fed from a yarn source to a yarn using device, particularly for use in weaving and knitting machines, of the type comprising: a fixed hollow body, around which the yarn coming from said source is wound into turns by an element rotating outwardly of said fixed body and coaxially thereto, to form thereon a yarn reserve from which the actual yarn is drawn, to be sent to said yarn using device, passing inside the fixed hollow body, adjustable brake means cooperating with said fixed body for braking the yarn with constant intensity, downstream of said yarn reserve; and means associated to the fixed hollow body, for adjusting and keeping even the amount of said yarn reserve; said yarn feeding device being characterized in that, the brake means comprise a round element, formed by a solid central part and by a peripheral part with radial blades, arranged between an electromagnet mounted on said rotary element for winding the yarn, and the outer edge of said hollow body onto which the yarn gets wound, said blades being elastically bent at their ends with which they engage said edge, and said electromagnet housing the end of its core into an appropriate seat provided at the centre of the solid part of said round element.

2. Device as in claim 1, in which said round element is of synthetic plastic material.

3. Device as in claim 1, in which said blades are in a number of thirty-six, being separated by slits inclined at 15° in respect of the radius contacting their end.

4. Device as in claim 1, in which said electromagnet is connected to an electric energy source through a potentiometer.

5. Device as in claim 4, in which said potentiometer is connected to the electric energy source through a cam switch.

6. Yarn feeding device with constant adjustable tension, the yarn being fed from a yarn source to a yarn using device, particularly for use in weaving and knitting machines, of the type comprising: a fixed hollow body, around which the yarn coming from said source is wound into turns by an element rotating outwardly of said fixed body and coaxially thereto, to form thereon a yarn reserve from which the actual yarn is drawn, to be sent to said yarn using device, passing inside the fixed hollow body; adjustable brake means cooperating with said fixed body, for braking the yarn with constant intensity, downstream of said yarn reserve; and means associated to the fixed hollow body, for adjusting and keeping even the amount of said yarn reserve, said yarn feeding device being characterized in that, the means for adjusting and keeping even the amount of the yarn reserve comprise two photoelectric elements—of which one is a transmitting element and the other is a receiving element—carried by an arm mounted inside said hollow body, and means for adjusting the position of said arm along the axis of said body, the position of said elements on said arm being such that the emission of one element may be picked up by the other, only if reflected by the yarn wound as reserve on said hollow body.

7. Device as in claim 6, in which said arm is mounted on two guides parallel to the axis of the hollow body, and may be shifted along said guides by acting on a wheel of the arm itself, associated to a screw parallel to the guides.

8. Device as in claim 6, in which said photoelectric transmitting element is a glow diode, and said photoelectric receiving element is a phototransistor.

9. Yarn feeding device as in claim 1, characterized in that, the hollow body is fixed onto a hollow shaft being fixed to a casing of the device, into which is mounted the stator of a motor operating said rotary element, the rotor of said motor being mounted onto a second hollow shaft, rotating around the first and being integral with said rotary element.

* * * * *